(12) United States Patent
Reiff

(10) Patent No.: US 6,366,415 B1
(45) Date of Patent: Apr. 2, 2002

(54) UNDERWATER SEEING DEVICE

(76) Inventor: Gary R. Reiff, 500 Gulf St., Venice, FL (US) 34285

( * ) Notice: Subject to any disclaimer, the term of this patent is extended or adjusted under 35 U.S.C. 154(b) by 0 days.

(21) Appl. No.: 09/714,913

(22) Filed: Nov. 17, 2000

(51) Int. Cl.[7] ................................ G02B 5/00; G02B 7/02
(52) U.S. Cl. ........................ 359/895; 359/440; 359/894
(58) Field of Search ........................ 359/399, 436–442, 359/800–818, 894–895

(56) References Cited

U.S. PATENT DOCUMENTS

| 737,844 A | * | 9/1903 | Hubbard | 359/895 |
| 2,712,139 A | | 7/1955 | Kelly | 359/894 |
| 2,730,921 A | * | 1/1956 | Little | 359/895 |
| 2,911,878 A | * | 11/1959 | Vernier | 359/895 |
| 2,968,208 A | * | 1/1961 | Shaw | 359/895 |
| 3,506,332 A | | 4/1970 | Dewey, Jr. et al. | 359/895 |
| 3,596,082 A | | 7/1971 | Doret et al. | 359/894 |
| 4,145,783 A | | 3/1979 | Rhodes | 9/310 H |
| 4,465,468 A | | 8/1984 | Deacy | 441/135 |
| 4,515,437 A | * | 5/1985 | Story | 359/894 |
| D311,410 S | | 10/1990 | Hall | D16/130 |
| 5,145,431 A | | 9/1992 | Dowdeswell | 441/135 |
| 5,491,589 A | * | 2/1996 | Haymond | 359/895 |
| 6,023,382 A | * | 2/2000 | Hollingsworth et al. | 359/895 |

* cited by examiner

Primary Examiner—Thong Nguyen

(57) ABSTRACT

An underwater seeing device for enabling the user to see underwater without having to bend over. The underwater seeing device includes an elongate tubular member having a main portion, a neck portion, a front end portion, and a passageway extending therethrough; and also includes magnifying lens being disposed in the elongate tubular member; and further includes a handle member being securely attached to the tubular member.

1 Claim, 2 Drawing Sheets

UNDERWATER SEEING DEVICE

BACKGROUND OF THE INVENTION

1. Field of the Invention

The present invention relates to an underwater viewing device and more particularly pertains to a new underwater seeing device for enabling the user to see underwater without having to bend over.

2. Description of the Prior Art

The use of an underwater viewing device is known in the prior art. More specifically, an underwater viewing device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,506,332; U.S. Pat. No. 4,145,783; U.S. Pat. No. 3,596,082; U.S. Pat. No. 2,712,139; U.S. Pat. No. Des. 311,410; U.S. Pat. No. 4,465,468; and U.S. Pat. No. 5,145,431.

While these devices fulfill their respective, particular objectives and requirements, the aforementioned patents do not disclose a new underwater seeing device. The inventive device includes an elongate tubular member having a main portion, a neck portion, a front end portion, and a passageway extending therethrough; and also includes magnifying lens being disposed in the elongate tubular member; and further includes a handle member being securely attached to the tubular member.

In these respects, the underwater seeing device according to the present invention substantially departs from the conventional concepts and designs of the prior art, and in so doing provides an apparatus primarily developed for the purpose of enabling the user to see underwater without having to bend over.

SUMMARY OF THE INVENTION

In view of the foregoing disadvantages inherent in the known types of underwater viewing device now present in the prior art, the present invention provides a new underwater seeing device construction wherein the same can be utilized for enabling the user to see underwater without having to bend over.

To attain this, the present invention generally comprises an elongate tubular member having a main portion, a neck portion, a front end portion, and a passageway extending therethrough; and also includes magnifying lens being disposed in the elongate tubular member; and further includes a handle member being securely attached to the tubular member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is another object of the present invention to provide a new underwater seeing device which may be easily and efficiently manufactured and marketed.

It is a further object of the present invention to provide a new underwater seeing device which is of a durable and reliable construction.

An even further object of the present invention is to provide a new underwater seeing device which is susceptible of a low cost of manufacture with regard to both materials and labor, and which accordingly is then susceptible of low prices of sale to the consuming public, thereby making such underwater seeing device economically available to the buying public.

Still yet another object of the present invention is to provide a new underwater seeing device which provides in the apparatuses and methods of the prior art some of the advantages thereof, while simultaneously overcoming some of the disadvantages normally associated therewith.

Still another object of the present invention is to provide a new underwater seeing device for enabling the user to see underwater without having to bend over.

Yet another object of the present invention is to provide a new underwater seeing device which includes an elongate tubular member having a main portion, a neck portion, a front end portion, and a passageway extending therethrough; and also includes magnifying lens being disposed in the elongate tubular member; and further includes a handle member being securely attached to the tubular member.

Still yet another object of the present invention is to provide a new underwater seeing device that allows the user to stand upright while looking for sea shells underwater.

Even still another object of the present invention is to provide a new underwater seeing device that is lightweight and easy to carry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such, description makes reference to the annexed drawings wherein.

DESCRIPTION OF THE PREFERRED EMBODIMENT

Figure 1:
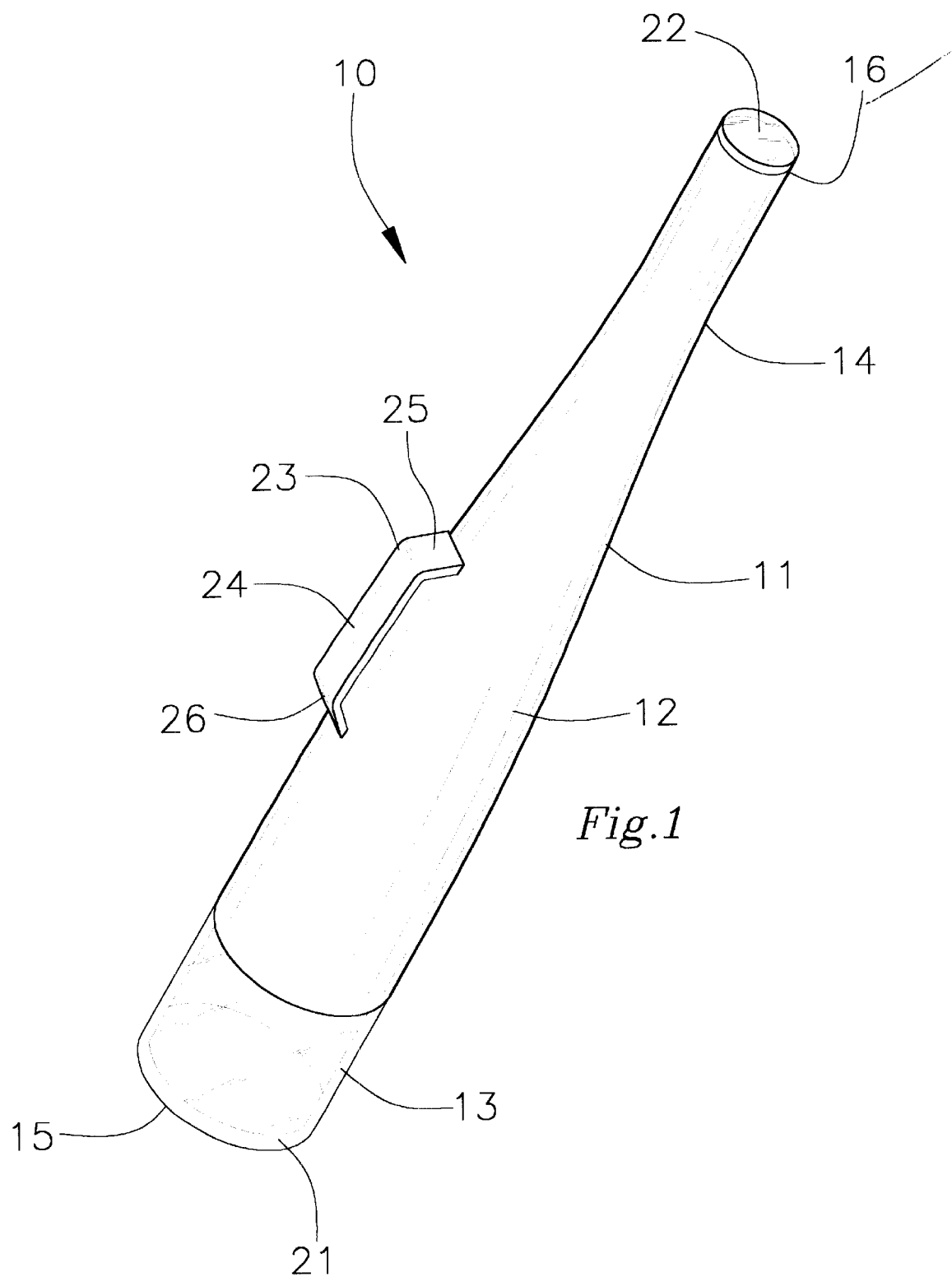
FIG. 1 is a perspective view of a new underwater seeing device according to the present invention.
Figures 2, 3:
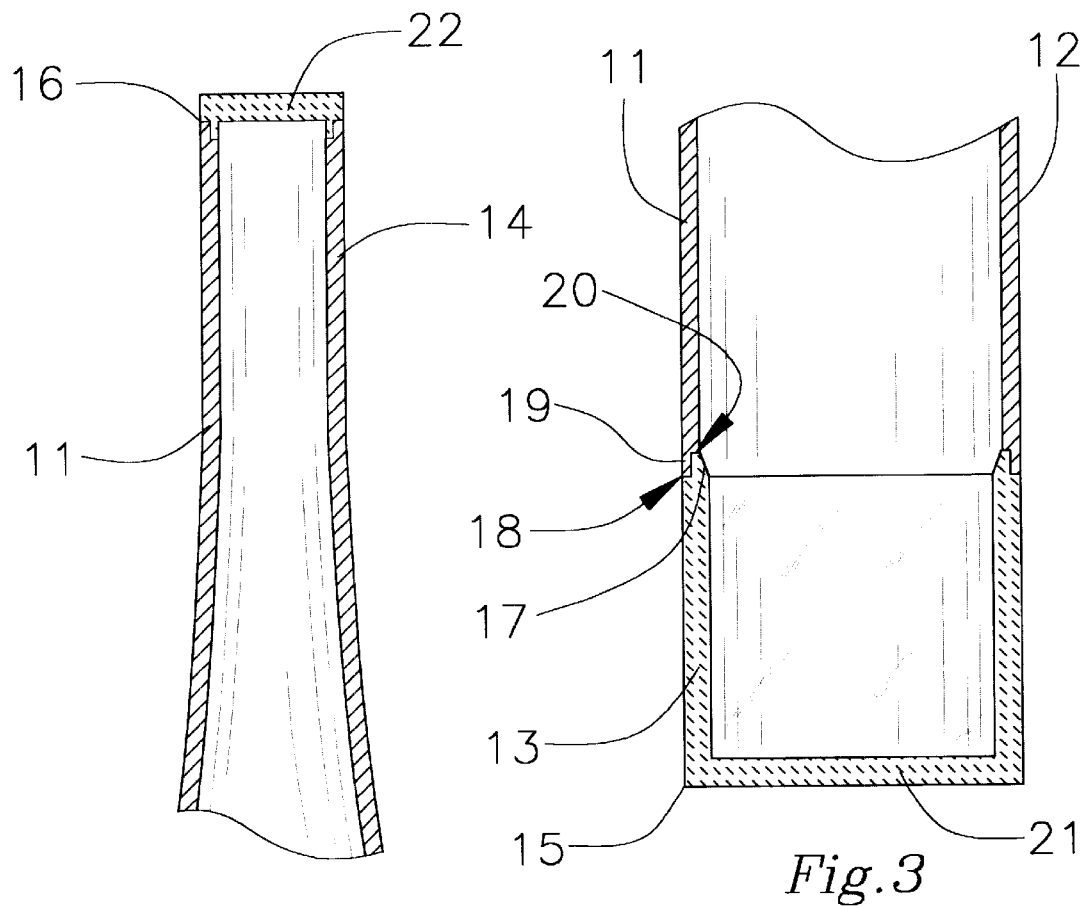
FIG. 2 is a side cross-sectional view of back end portion of the present invention.
FIG. 3 is a side cross-sectional view of front end portion of the present invention.
Figure 4:
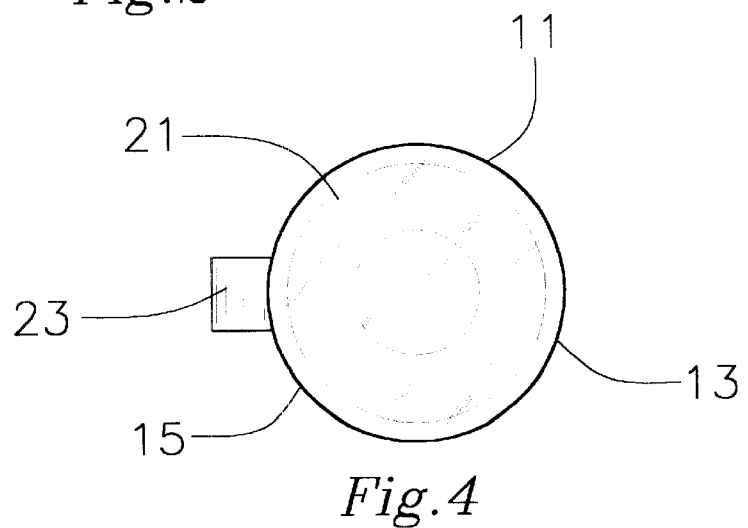
FIG. 4 is a bottom end view of the present invention.

With reference now to the drawings, and in particular to FIGS. 1 through 4 thereof, a new underwater seeing device embodying the principles and concepts of the present invention and generally designated by the reference numeral 10 will be described.

As best illustrated in FIGS. 1 through 4, the underwater seeing device 10 generally comprises an elongate tubular member 11 having a main portion 12, a neck portion 14, a front end portion 13, and a passageway extending therethrough. The elongate tubular member 11 is tapered from a middle portion of the main portion 12 to the neck portion 14. The front end portion 13 is made of transparent material and has a back rim 17 which is engaged to a front rim 19 of the main portion 12. The back rim 17 has a recessed portion 18 disposed therein, and the front rim 19 has a recessed portion 20 disposed therein. The back rim 17 is securely and conventionally received in the recessed portion 20 of the front rim 19, and the front rim 19 is securely and conventionally received in the recessed portion 18 of the back rim 17. The elongate tubular member 11 is generally bottle-shaped with the elongate tubular member 11 having a length of approximately 36 inches.

Magnifying lens 21,22 is conventionally disposed in the elongate tubular member 11. The magnifying lens 21,22 include a first magnifying lens 21 being conventionally disposed at a front end 15 of the front end portion 13, and also include a second magnifying lens 22 being conventionally disposed at a back end 16 of the neck portion 14 of the elongate tubular member 11. The first magnifying lens 21 has a diameter of approximately 4 inches, and the second magnifying lens 22 having a diameter of approximately 2½ inches.

A handle member 23 is securely and conventionally attached to the tubular member 11. The handle member 23 is. Securely and conventionally attached to an exterior of the main portion 12 of the elongate tubular member 11 and has a main portion 24 which is spaced from the elongate tubular member 11, and also has end portions 25,26 which are angled relative to the main portion 24 of the handle member 23 and which are securely and conventionally attached to the elongate tubular member 11.

In use, the user looks through the back end 16 of the elongate tubular member 11 with the front end 15 of the elongate tubular member 11 being disposed in the water. The transparent front end portion 13 of the elongate tubular member 11 allows the user to peripherally view through the sides of the front end portion 13 to find objects such as sea shells upon the bottom surface in the water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An underwater seeing device comprising:

an elongate tubular member having a main portion, a neck portion, a front end portion, and a passageway extending therethrough, said elongate tubular member being tapered from a middle portion of said main portion to said neck portion, said front end portion being made of transparent material and having a back rim which is engaged to a front rim of said main portion, said back rim having a recessed portion disposed therein and said front rim having a recessed portion disposed therein, said back rim being securely received in said recessed portion of said front rim and said front rim being securely received in said recessed portion of said back rim, said elongate tubular member being generally bottle-shaped, said elongate tubular member having a length of approximately 36 inches;

magnifying lens being disposed in said elongate tubular member, said magnifying lens including a first magnifying lens being disposed at front end of said front end portion, and also including second magnifying lens being disposed at a back end of said neck portion of said elongate tubular member, said first second magnifying lens having a diameter of approximately 4 inches, said second magnifying lens having a diameter of approximately 2½ inches; and a handle member being securely attached to said tubular member, said handle member being securely attached to an exterior of said main portion of said elongate tubular member and having a main portion which is space from said elongate tubular member, and also having end portion which are angled relative to said main portion of said handle member and which are securely attached to said elongate tubular member.

* * * * *